(12) United States Patent
Zahn et al.

(10) Patent No.: US 8,713,506 B2
(45) Date of Patent: Apr. 29, 2014

(54) SYSTEM AND METHOD FOR EMPLOYING SIGNOFF-QUALITY TIMING ANALYSIS INFORMATION CONCURRENTLY IN MULTIPLE SCENARIOS TO REDUCE DYNAMIC POWER IN AN ELECTRONIC CIRCUIT AND AN APPARATUS INCORPORATING THE SAME

(75) Inventors: Bruce Zahn, Allentown, PA (US);
James C. Parker, Zionsville, PA (US);
Benjamin Mbouombouo, Saratoga, CA (US)

(73) Assignee: LSI Corporation, Milpitas, CA (US)

( * ) Notice: Subject to any disclaimer, the term of this patent is extended or adjusted under 35 U.S.C. 154(b) by 122 days.

(21) Appl. No.: 13/034,167

(22) Filed: Feb. 24, 2011

(65) Prior Publication Data
US 2012/0221995 A1 Aug. 30, 2012

(51) Int. Cl.
*G06F 17/50* (2006.01)

(52) U.S. Cl.
USPC .......................................... 716/122; 716/120

(58) Field of Classification Search
USPC .................................. 716/132–136
See application file for complete search history.

(56) References Cited

U.S. PATENT DOCUMENTS

| | | | |
|---|---|---|---|
| 8,196,086 B2 * | 6/2012 | Brown et al. | 716/133 |
| 2004/0049752 A1 * | 3/2004 | Iwanishi et al. | 716/6 |
| 2010/0050144 A1 | 2/2010 | Zahn | |
| 2010/0153897 A1 * | 6/2010 | Zahn | 716/9 |
| 2010/0169847 A1 | 7/2010 | Gupta et al. | |
| 2011/0191738 A1 * | 8/2011 | Walker et al. | 716/119 |
| 2012/0221995 A1 | 8/2012 | Zahn et al. | |

* cited by examiner

*Primary Examiner* — Binh Tat (57) ABSTRACT

A dynamic power recovery system and method are disclosed herein. Additionally, an EDA tool and apparatus configured to perform dynamic power recovery are disclosed. In one embodiment, the system includes: (1) a power recovery module configured to carry out an instance of an initial power recovery process in each of multiple scenarios concurrently, the initial power recovery process including making first conditional downsizing of cells in at least one path in a circuit design with lower dynamic power cells and estimating a delay and a slack of the at least one path based on the first conditional downsizings and (2) a speed recovery module associated with the power recovery module and configured to carry out a speed recovery process in each of the multiple scenarios concurrently, the speed recovery process including determining whether the first conditional downsizings cause a timing violation with respect to the at least one path and making second conditional upsizings with higher dynamic power cells until the timing violation is removed.

20 Claims, 5 Drawing Sheets

SYSTEM AND METHOD FOR EMPLOYING SIGNOFF-QUALITY TIMING ANALYSIS INFORMATION CONCURRENTLY IN MULTIPLE SCENARIOS TO REDUCE DYNAMIC POWER IN AN ELECTRONIC CIRCUIT AND AN APPARATUS INCORPORATING THE SAME

CROSS-REFERENCE TO RELATED APPLICATION

This application is related to U.S. patent application Ser. No. 12/198,030, filed by Zahn on Aug. 25, 2008, entitled "System and Method for Employing Signoff-Quality Timing Analysis Information to Reduce Leakage Power in an Electronic Circuit and Electronic Design Automation Tool Incorporating the Same" and to U.S. patent application Ser. No. 12/333,288, filed by Zahn on Dec. 11, 2008, entitled "System And Method For Employing Signoff-Quality Timing Analysis Information Concurrently In Multiple Scenarios To Reduce Leakage Power In An Electronic Circuit And Electronic Design Automation Tool Incorporating The Same." Both of the above applications are commonly assigned with this application and are incorporated herein by reference.

TECHNICAL FIELD

This application is directed, in general, to electronic circuits, such as integrated circuits (ICs) and, more specifically, to designing electronic circuits.

BACKGROUND

Power consumption is a concern in most circuit designs, particularly those that are to be battery-powered. Circuit designs should achieve the lowest possible power consumption while achieving defined performance targets. Timing is a major concern in all IC designs, because circuits will not operate properly unless signals can propagate properly through them. Consequently, "timing signoff" is a required step in the designing of a circuit, particularly an IC, and involves using a signoff analysis tool to determine the time that signals will take to propagate through the circuit. If propagation time is inadequate, critical paths in the circuit may have to be modified, or the circuit may have to operate at a slower speed. Power and timing objectives are often at odds; faster devices usually require more power than slower devices, and vice versa.

Electronic design automation (EDA) tools, a category of computer aided design (CAD) tools, are used by electronic circuit designers to create representations of the cells in a particular circuit and the conductors (called "interconnects" or "nets") that couple the cells together. EDA tools allow designers to construct a circuit design and simulate its performance using a computer and without requiring the costly and lengthy process of fabrication. EDA tools are indispensable for designing modern, very-large-scale integrated circuits (VSLICs). For this reason, EDA tools are in wide use. For example, many EDA tool companies offer EDA tools that perform both power and timing optimization.

SUMMARY

One aspect provides a dynamic power recovery system. In one embodiment, the system includes: (1) a power recovery module configured to carry out an instance of an initial power recovery process in each of multiple scenarios concurrently, the initial power recovery process including making first conditional downsizing of cells in at least one path in a circuit design with lower dynamic power cells and estimating a delay and a slack of the at least one path based on the first conditional downsizings and (2) a speed recovery module associated with the power recovery module and configured to carry out a speed recovery process in each of the multiple scenarios concurrently, the speed recovery process including determining whether the first conditional downsizings cause a timing violation with respect to the at least one path and making second conditional upsizings with higher dynamic power cells until the timing violation is removed.

In another aspect, a dynamic power recovery method is disclosed. In one embodiment, the method is carried out in each of multiple scenarios concurrently and includes: (1) making first conditional downsizing of cells in at least one path in a circuit design with lower dynamic power cells, (2) estimating a delay and a slack of the at least one path based on the first conditional downsizing, (3) determining whether the first conditional downsizings cause a timing violation with respect to the at least one path, (4) making second conditional upsizings with higher dynamic power cells until the timing violation is removed and (5) merging and applying the downsizings and upsizings and updating timing with respect to the each of the multiple scenarios.

In yet another aspect, an EDA tool is disclosed. In one embodiment, the EDA tool includes: (1) an initial power recovery module configured to identify cells in positive timing margin paths of a circuit design and provide downsized cells for the cells that have a lower dynamic power thereof, the cells complying with a timing signoff of the circuit design and (2) a speed recovery module configured to determine timing violations caused by employing the downsized cells for the cells and upsize back a minimum amount of the downsized cells to correct the timing violations.

In still yet another aspect, an apparatus is disclosed. In one embodiment, the apparatus includes: (1) circuitry for making first conditional downsizing of cells in at least one path in a circuit design with lower dynamic power cells, (2) circuitry for estimating a delay and a slack of the at least one path based on the first conditional downsizing, (3) circuitry for determining whether the first conditional downsizings cause a timing violation with respect to the at least one path, (4) circuitry for making second conditional upsizings with higher dynamic power cells until the timing violation is removed and (5) circuitry for merging and applying the downsizings and upsizings and updating timing with respect to the each of the multiple scenarios.

BRIEF DESCRIPTION

Reference is now made to the following descriptions taken in conjunction with the accompanying drawings, in which.

DETAILED DESCRIPTION

The conventional EDA tools with combined power and timing optimization employ approximate circuit models and parameters to represent a circuit design and are used well before timing signoff. Timing signoff then becomes an iterative process of using the signoff analysis tool to analyzing timing on an accurate representation of the finished circuit design, reoptimizing for power and timing using the combined optimization tool and reanalyzing using the signoff analysis tool until further optimization becomes unfruitful. Some EDA tool companies offer power optimization tools that run in conjunction with the signoff analysis tool. This, however, requires an additional power optimization tool in conjunction with the signoff timing analysis tool. As such, users are required to purchase and learn an additional power optimization tool to design a circuit and resolve coordination issues between the power optimization tool and the signoff analysis tool. Such power optimization tools also do not readily adapt to specific requirements for a particular circuit design.

Described herein is a power optimization scheme that operates in a timing signoff environment. Disclosed are various embodiments of an apparatus, such as an EDA tool, and method for employing signoff-quality timing analysis information to reduce dynamic power in an electronic circuit, such as an IC. One embodiment of the method, referred to herein as a dynamic power recovery method, is carried out during timing signoff to achieve improved, perhaps optimal, dynamic power levels while preserving the timing performance of the circuit design. The dynamic power recovery method analyzes the timing of a circuit design and does cell downsizing of larger cells to lower dynamic power cells on paths of the circuit design having a positive timing margin. Cell downsizing is replacing a cell of the circuit design with another cell, i.e., a downsized cell, having the same functionality but employing less dynamic power. The lower dynamic power cells are inherently slower, but the dynamic power recovery method determines how many lower dynamic power cells can be used without adversely affecting performance targets. The lower dynamic power cells, i.e., the downsized cells, are smaller (i.e., have a smaller footprint) and can be implemented into the design of the IC with minimal disturbance to the layout routing.

Unlike conventional combined optimization tools described above, the dynamic power optimization scheme described herein operates with an accurate representation of the finished circuit design such that an iterative approach to power recovery between a timing signoff tool and a power optimization tool is no longer required. Additionally, unlike the conventional power optimization tools that run in conjunction with a signoff analysis tool, the dynamic power recovery scheme disclosed herein can be integrated within an existing signoff methodology. As such, no additional costs or learning time is needed for an additional tool. Additionally, coordination issues between the power optimization tool and a signoff analysis tool need not exist. Furthermore, the dynamic power recovery scheme readily adapts to requirements specific to a particular circuit design.

The illustrated embodiments of the dynamic power recovery system and method are carried out as part of timing signoff. A signoff analysis tool, called Primetime-SI® (commercially available from Synopsys, Inc., of Mountain View, Calif.), will be referenced for purposes of describing the dynamic power recovery system and method. In fact, most described embodiments of the dynamic recovery system and method are carried out ancillary to or from within Primetime-SI®. However, those skilled in the pertinent art will recognize that the dynamic power recovery method may be used with or within any conventional or later-developed signoff analysis tool.

Certain embodiments described herein employ the Distributed Multi-Scenario Analysis (DMSA) feature of Primetime-SI®. The DMSA feature allows timing analysis to be done in a distributed manner in multiple threads or on multiple computers for multiple corners or operating modes. These multiple threads or multiple computers may be regarded as slave processes. Each corner or mode is called a "scenario" and represents an independent Primetime-SI® run at a particular corner or mode. A master process in Primetime-SI® receives information from the slave processes, merging the results of the timing analyses performed thereby. Those skilled in the pertinent art will recognize that other conventional or later-developed signoff analysis tools may have features similar to DMSA; the principles described herein extend to such features.

In one embodiment, the dynamic power recovery method may include initial power recovery, speed recovery, transition recovery and capacitance recovery. The input to this dynamic power recovery method is a slack limit value. The dynamic power recovery method will perform dynamic power recovery while ensuring that timing performance does not fall below the value of the slack limit. The initial power recovery process may identify all clock cells and cells that have timing below the slack limit provided and mark these cells as "dont_swap." All remaining constrained cells are looped on to determine if they should be swapped to achieve better dynamic power. Timing updates may be avoided by estimating delay slowdowns to optimize runtime. After all cells are processed, the cell downsizes may be applied and a timing update occurs. After a timing update, timing failures, transition violations, and capacitance violations can be seen. These timing failures can occur due to a number of reasons such as: timing estimates based on limited factors (input transition, output load), downsized cells may have different pin capacitance and drive capability and crosstalk effects that are not accounted for during delay estimation.

Multiple iterations of speed recovery may then be performed to repair any timing that is below the user specified slack limit. Each iteration can loop through the failing timing paths, upsizing back the minimum amount of cells to repair the timing while preserving the best dynamic power. After the speed recovery phase, transition and capacitance recovery phase is performed to address transition and capacitance violations that may have been introduced during the initial power recovery phase. The dynamic power recovery method may perform these steps at all PVT corners or analysis modes. As a result, the dynamic power recovery method can generate a list of cell downsizes that can be implemented in the design to achieve better dynamic power for the circuit while meeting the performance target for the circuit.

Figure 1:
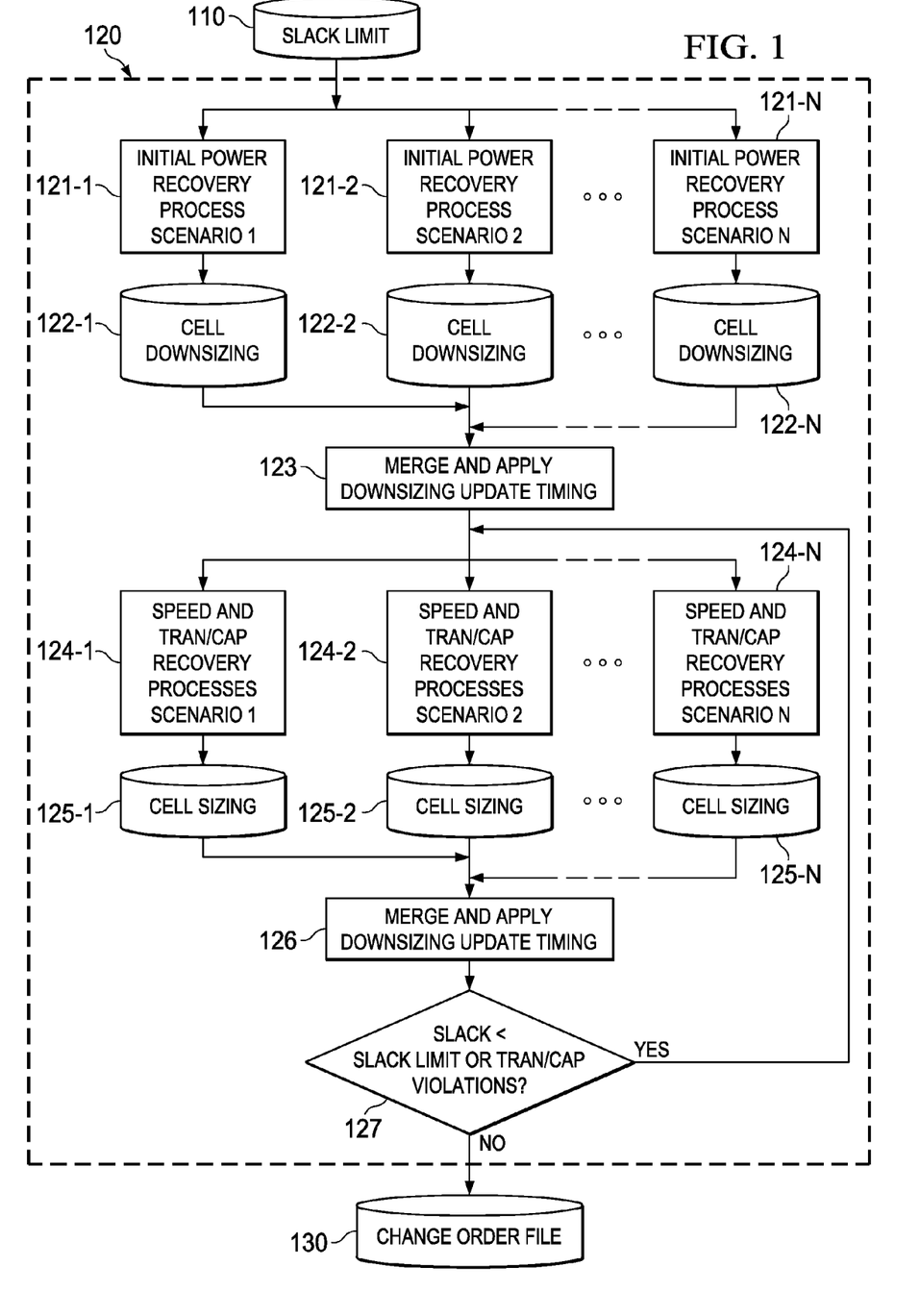
FIG. 1 illustrates a high-level block diagram of one embodiment of a dynamic power recovery system and method carried out according to the principles of the disclosure.

FIG. 1 illustrates a high-level block diagram of one embodiment of a dynamic power recovery system and method carried out according to the principles of the disclosure. The system may be implemented in an EDA tool. The input to the dynamic power recovery system and method is a user-defined slack limit 110. Slack is defined as the difference between the time required for a transition to propagate from the start to the end of a particular path and the time required for a transition to propagate from the start to the end of the slowest path that terminates at the same end as the particular path (the "critical path"). A positive slack indicates the degree to which the particular path is faster than the critical path. A negative slack indicates the degree to which the particular path is slower than the critical path. A slack limit is a positive number that a user defines to be any desired value, e.g., 0.20 ns. The slack limit 110 may be input via a conventional user interface, such as, a keyboard, a touch screen, a mouse, etc. An EDA tool may receive the slack limit 110 via, for example, such a user interface.

In the embodiment of FIG. 1, a timing signoff tool performs signoff analyses 120 concurrently for each of at least two corners or modes: Scenario 1, Scenario 2, . . . , Scenario N in the illustrated embodiment. A corner represents particular assumptions regarding circuit fabrication or operating voltage or temperature variables. For example, variations in feature size and physical characteristics caused by expected variations in a normal fabrication process may cause internal capacitance and resistance to vary over the area of a given IC (so-called "on-chip variations, or ICV") or from one IC to another. Likewise, variations in operating voltages or temperatures may cause cells to propagate transitions faster or slower. An analysis performed in a "slow corner" is therefore undertaken assuming that cells operate as slowly as possible given a normal fabrication variations and relatively low operating voltages and temperatures. Analyses may also be performed in average or fast corners. Corners may therefore be thought of as, e.g., worst, typical and best cases for analysis. All corners, and not just the process, voltage and temperature (PVT) corners described above, fall within the broad scope of the disclosure. In the illustrated embodiment, one of the corners (Scenario 1, Scenario 2, . . . , Scenario N) is a slow corner.

The timing signoff tool 120 may obtain data for the various cells of the circuit design from a cell library. One skilled in the art will understand obtaining cell data from a cell library by an EDA tool. In one embodiment, a cell library may be used that relates cells of different sizes with corresponding cells of the same functionality. As such, the timing signoff tool 120 may employ the noted relationships, such as via an index, for cell downsizing and even cell upsizing.

In the illustrated embodiment, the system includes four recovery modules: a power recovery module, a speed recovery module, a transition recovery module and a capacitance recovery module. The power recovery module is configured to carry out an instance of an initial power recovery process for each of multiple scenarios (i.e., Scenario 1, Scenario 2, . . . , Scenario N) concurrently, viz., initial power recovery processes 121-1, 121-2, 121-N. Cells are downsized on the basis of the initial power recovery processes in corresponding instances of cell sizing processes 122-1, 122-2, 122-N carried out concurrently for each of the scenarios. Repeating the initial power recovery processes 121-1, 121-2, . . . , 121-N over multiple scenarios may be particularly advantageous for circuits having multiple modes of operation. The circuit is likely to have a corner, e.g., a slow corner, in each mode that would benefit from a power recovery process carried out according to the principles of the disclosure. The cell downsizings are then merged and applied, and a timing update is performed as indicated in a process 123.

In one embodiment, the initial power recovery processes 121-1, 121-2, . . . , 121-N identify all clock cells and cells that have timing below the user-defined slack limit provided and marks these as "don't_swap." All remaining constrained cells are then analyzed to determine if they could be downsized to achieve better dynamic power optimization. The initial power recovery processes 121-1, 121-2, . . . , 121-N estimate delay slowdowns to avoid timing updates and thereby reduce runtime. After all cells are processed, cell downsizes are applied, and a timing update then occurs. After a timing update, timing failures, transition violations, and capacitance may then be determined. Timing failures may result from, for example, timing estimates that are based on limited factors (e.g., in input transition or output load), downsized cells that have different pin capacitance and drive capability and crosstalk effects that may not be accounted for during delay estimation.

The speed, transition and capacitance recovery modules are respectively configured to carry out an instance of a speed, transition and capacitance recovery process for each of multiple scenarios (i.e., Scenario 1, Scenario 2, . . . , Scenario N) concurrently, viz., speed, transition and capacitance recovery processes 124-1, 124-2, . . . , 124-N. After the power recovery module has carried out the initial power recovery processes 121-1, 121-2, . . . , 121-N, the speed recovery module may perform multiple iterations of the speed recovery processes in each scenario to repair any timing that is below a user-defined slack limit. In one embodiment, each iteration of each instance of the speed recovery process loops through the failing timing paths, upsizing the minimum amount of cells to repair the timing while preserving the best dynamic power.

After the speed recovery processes are performed as part of the processes 124-1, 124-2, . . . , 124-N, the transition and capacitance recovery processes are carried out as part of the processes 124-1, 124-2, 124-N to analyze any transition and capacitance violations that may have been introduced during the initial power recovery processes 121-1, 121-2, . . . , 121-N. In the embodiment of FIG. 1, the transition and capacitance recovery processes may be conventional processes carried out in a signoff analysis tool. However, those skilled in the pertinent art will understand that later-developed transition and capacitance recovery processes fall within the broad scope of the disclosure.

Cells are again substituted on the basis of the speed, transition and capacitance recovery processes in corresponding cell swap processes 125-1, 125-2, . . . , 125-N that occur concurrently in each of the scenarios. Downsized cells may be upsized to the original cell in cell swap processes 125-1, 125-2, . . . , 125-N. The upsizing is performed in such a manor as to achieve the lowest dynamic power while still meeting the timing requirements for the circuit. The cell swaps are then merged and applied, and a timing update is performed as indicated in a process 126. A slack limit and transition and capacitance violation test is applied in a process 127. If the test is failed (signified by the YES branch), the speed, transition and capacitance recovery processes 124-1, 124-2, . . . , 124-N are carried out again as indicated. If the test is passed, an engineering change order (ECO) file 130 may then be produced. The ECO file 130, if implemented, is expected to yield a circuit that exhibits at least some degree of dynamic power optimization while meeting the performance target for the circuit design.

Embodiments of the Power Recovery Process

Figure 2:
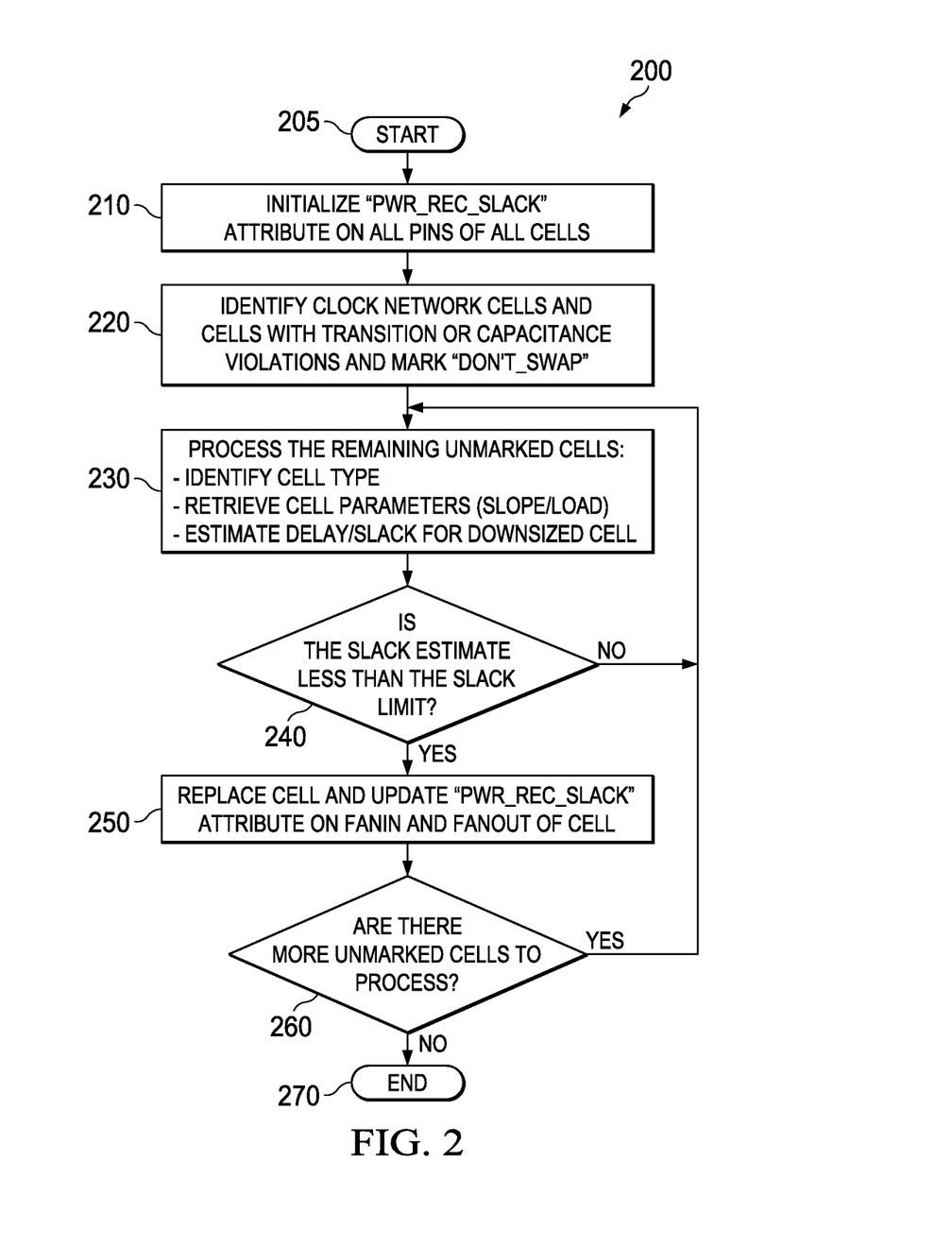
FIG. 2 illustrates a flow diagram of one embodiment of one instance of the initial power recovery process carried out in the system and method of FIG. 1.

FIG. 2 illustrates a flow diagram of one embodiment of one instance of the initial power recovery process 200 carried out in the system and method of FIG. 1. In general, the power recovery process examines cells in the circuit design and their timing slack to determine if cells can be downsized to a lower dynamic power cell without reducing the timing slack below the user specified limit. The process 200 begins in a step 205.

Figure 3:
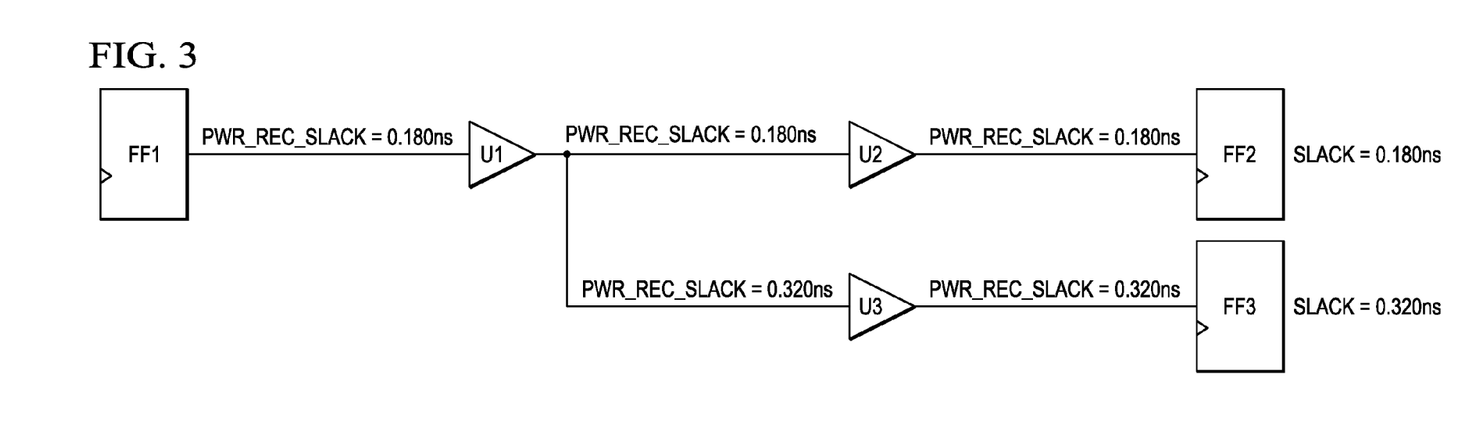
FIG. 3 illustrates a schematic diagram of a portion of an example circuit illustrating operation of the power recovery process of FIG. 2.

In a step 210, every pin in a database of the cells of the IC is initialized with an attribute called "pwr_rec_slack." This attribute contains the worst timing slack value (rise or fall) that any timing path through that pin encounters. For example, FIG. 3 illustrates a schematic diagram of a portion of an example circuit illustrating operation of the power recovery process 200 of FIG. 2. FIG. 3 contains two timing paths that include the output pin "U1/Z." One path starts at FF1 and ends at FF2 with a timing slack of 0.180 ns, and another path starts at FF1 and ends at FF3 with a timing slack of 0.320 ns. Since the worst timing slack through the output pin "U1/Z" is 0.180 ns, its pwr_rec_slack attribute is set to 0.180 ns. The output pin "U3/Z" has a worst timing slack set to 0.320 ns.

After the design is initialized with these "pwr_rec_slack" attributes in the step 210, clock network cells and cells with transition or capacitance violations, e.g., those that have an initial starting timing slack below the user-defined slack limit, or cells that are unconstrained are identified. A cell that is unconstrained does not contain a timing slack value since it is constrained in another mode of analysis, such as DFT modes (as compared to a functional mode). Every such cell is marked "don't_swap" in a step 220; only cells not marked "don't_swap" are then processed.

The remaining cells, those not marked "don't swap" are then processed in a step 230. As each cell is processed, the type of cell is identified as well as the functional alternatives that have lower dynamic power. The cells may be sorted by ascending slack, such that those having the least (worst) slack are at the top of the list and those having the greatest slack are at the bottom of the list. The input transition ramp time and output load capacitance of each cell processed is also identified in the step 230. Using these parameters, it is possible to estimate how much each cell would slow down if it were downsized with a smaller cell having the same functionality and pin out. If the estimated slowdown results in a timing slack that is still above the user-defined slack limit (determined in a decisional step 240), the cell is scheduled to be downsized in a step 250. If not, the process 200 continues to step 230. Accordingly, a cell is chosen that would result in the lowest dynamic power while still meeting the timing requirements.

In the step 250, the "pwr_rec_slack" attributes of all pins in the transitive fanout of the pin being processed are then updated to reflect this slow down, and the transitive fanin to each of the cell's input pins are examined to see if their "pwr_rec_slack" attributes should be updated. Each of the "pwr_rec_slack" attribute of the pins in the transitive fanin is updated if its value is equal to the original cell's "pwr_rec_slack" value. The reason that only the pins with a "pwr_rec_slack" attribute equal to the current cell's input pin "pwr_rec_slack" attribute are modified is to ensure that the fanin pins are on the worst path. If a fanin pin does not have the same "pwr_rec_slack" value, it is involved in a different worst path and is not modified. For example, with reference to FIG. 3, assuming "U3" is being downsized with a lower dynamic cell and being slowed down by 0.050 ns. It would not be correct to adjust the "pwr_rec_slack" value on the output pin of "U1" because its worst path is still the path from FF1 to FF2 has a slack of 0.180 ns. Without incurring a timing update, it is not possible to update all the slack attributes in the design. Therefore only updating the ones that are equal to the pin of the cell being processed ensures, these are on the same worst path.

The loop is repeated via the decisional step 260 until each unmarked cell in the circuit has been processed. If there are no further unmarked cells to process, the method ends in a step 270.

The result of the power recovery process 200 is a list of cell downsizes that should be implemented. The timing of the circuit design is then updated. This update likely causes timing (speed) violations, transition violations and capacitance violations. At this stage multiple iterations of speed recovery are performed to repair any timing that is below the user-defined slack limit.

Embodiments of the Speed Recovery Process

Figure 4:
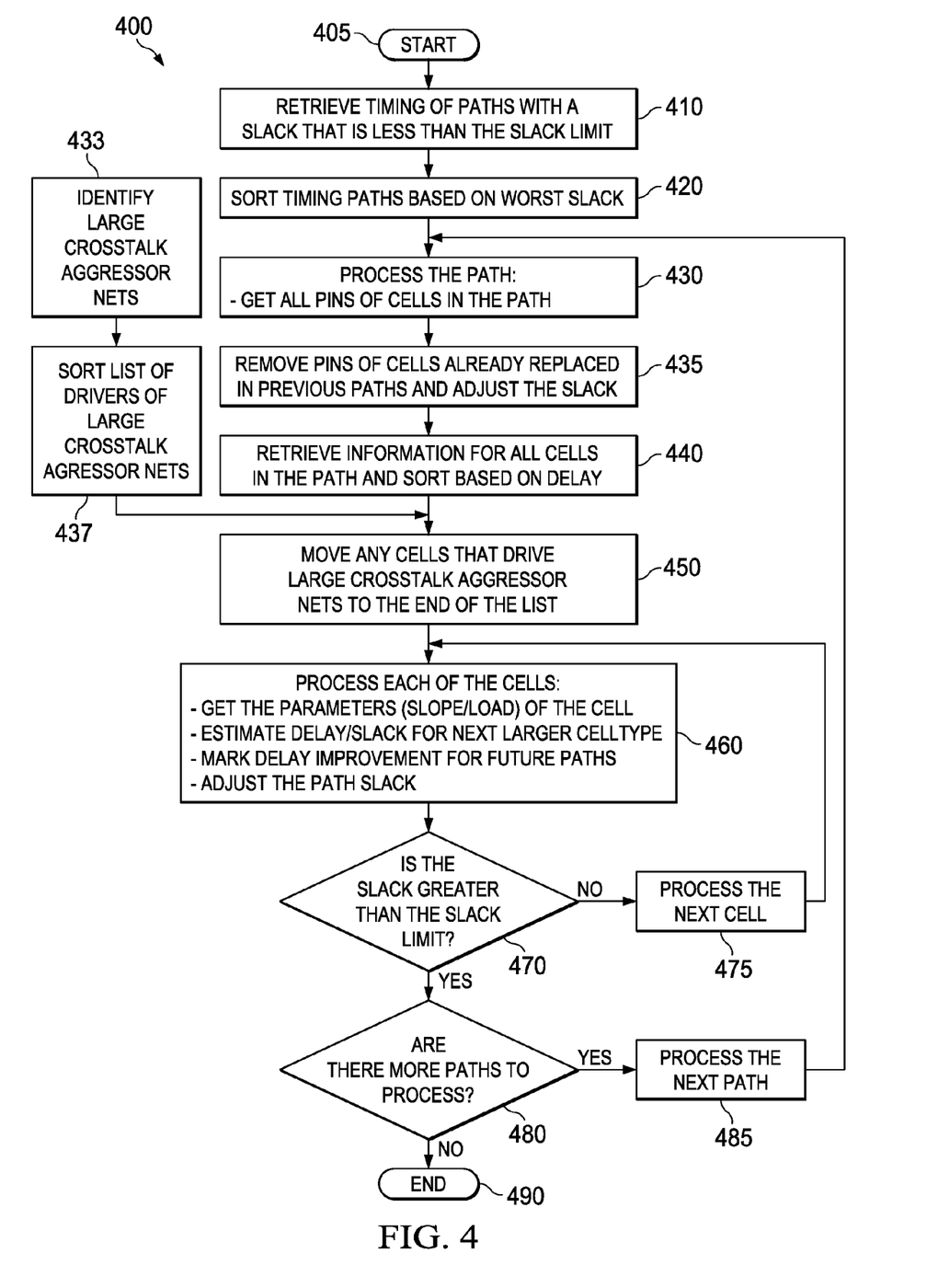
FIG. 4 illustrates a flow diagram of one embodiment of one instance of a speed recovery process carried out in the system and method of FIG. 1.

FIG. 4 illustrates a flow diagram of one embodiment of one instance of a speed recovery process 400 carried out in the system and method of FIG. 1. The illustrated embodiment of the speed recovery process 400 analyzes failing paths to perform cell upsizes to repair the timing of the circuit design while preserving the best dynamic power. As such, the speed recovery process 400 includes determining whether the first conditional downsizings cause a timing violation with respect to a path and making second conditional upsizings with higher dynamic power cells until the timing violation is removed in such a manor as to result in lowest dynamic power. The speed recovery process 400 gets the failing paths for each clock group and sorts them by worst timing slack. The speed recovery process 400 also takes into consideration cells that are crosstalk aggressors of crosstalk victim nets. The cells that drive crosstalk aggressor nets (those having crosstalk exceeding a threshold) are handled differently to minimize the introduction of additional crosstalk delay variation on victim nets, which can degrade timing. Those skilled in the pertinent art are aware of how to calculate the degree to which nets are responsible for crosstalk with adjacent nets. The speed recovery process 400 begins in a step 405.

The speed recovery process 400 retrieves the timing of failing paths in a step 410 and sorts the failing paths for each clock group by worst (least) timing slack in a step 420. For each path, the pins of the cells in the path are retrieved in a step 430. Pins of cells already swapped by the speed recovery process 400 (due to their being in previously processed paths) are removed in a step 435, and the slack is adjusted accordingly. Information regarding all cells in the path are retrieved in a step 440 and sorted into a list based on delay. In the illustrated embodiment, the cells are sorted by descending delay.

Figure 5:
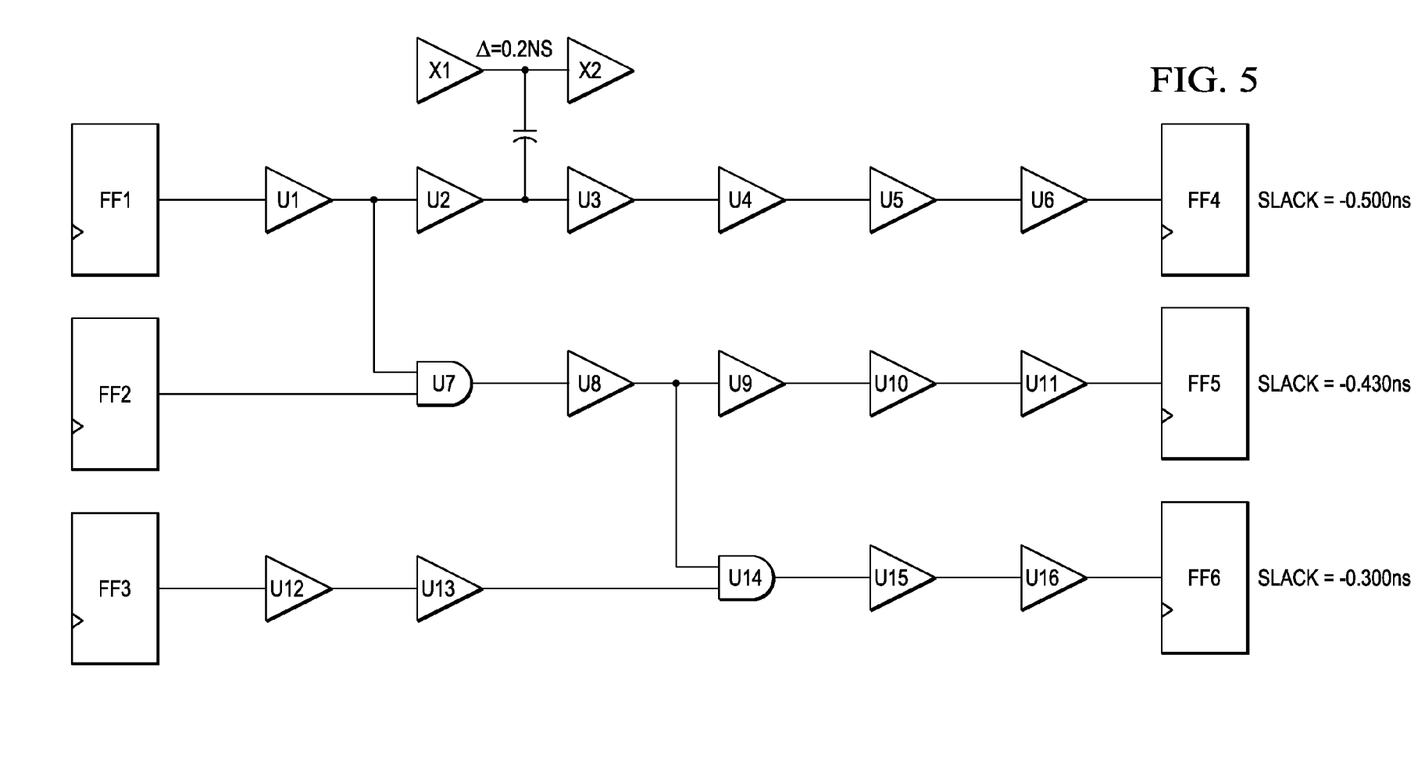
FIG. 5 illustrates a schematic diagram of a portion of an example circuit prior to operation of the speed recovery process of FIG. 4, which will be used to understand the illustrated embodiment of the speed recovery process.

FIG. 5 illustrates a schematic diagram of a portion of an example circuit prior to operation of the speed recovery process of FIG. 4, which will be used to understand the illustrated embodiment of the speed recovery process. Before processing the failing paths of the circuit design, an analysis is done in a step 433 to identify the largest crosstalk aggressor nets of victim nets involved in failing timing paths. Large crosstalk aggressor nets are sorted in a step 437. In a step 450, the cells that drive the large aggressor nets are moved to the bottom of the sorted list. In the illustrated embodiment, crosstalk aggression is used as a cost factor when processing paths to determine the best candidates to upsize to faster cells with higher dynamic power. Employing crosstalk aggression as a cost factor discourages upsizing a cell that is an aggressor to many victim nets which can result in timing degradation on the paths these victim nets are involved.

In the example circuit of FIG. 5, the worst timing path is from FF1 to FF4 with a timing slack of −0.500 ns. The next worst path is from FF1 to FF5 with a timing slack of −0.430 ns and so on. Notice that certain endpoint flip flops such as FF5 and FF6 have multiple timing paths from different starting points. For example FF5 has two timing paths, one from FF1 and one from FF2. Turning back to FIG. 4, the speed recovery process 400 loops on failing timing paths and sorts them by the worst timing slack. When processing the worst timing path the speed recovery process 400 loops through each cell thereof. So when processing the FF1 to FF4 path, all the cells are sorted in descending order of cell delay. Any cells that have been identified earlier as being involved as crosstalk aggressors are put to the bottom of the sorted list. For example, instance U2 is an aggressor to the net driven by instance "X1" and is therefore considered last for cell upsizing to avoid increasing the aggression. Each of these cells is then processed to get its input transition and output load in a step 460. Based on these parameters, an estimated delay is obtained for the next larger size of this cell type in the step 460. The timing slack is then adjusted by the delay improvement of this upsize in the step 460. Additional cells are processed unless the timing slack becomes greater than the user-defined slack limit (as determined in the decisional step 470, which reiterates the loop via the step 475). This ensures the minimum number of upsizes to larger cells to meet the timing performance target and also result in a low, or ideally the lowest, dynamic power for the circuit.

The delay improvement estimate is stored on the output pin of the cell scheduled to be upsized. This is done so that if this cell is involved in other timing paths the slack can be adjusted before any new cells in the timing path are processed. For example, while processing path FF1 to FF4, U1 is marked to be upsized and this result is a 0.050 ns faster delay on U1. This delay is stored on the output pin of U1. When the FF1 to FF5 path is processed the speed recovery process 400 first checks if any cells have been upsized from a previous path and adjusts the slack by the delay improvement. In this case the slack value would be adjusted by the 0.050 ns improvement from U1. When the cells in a path are being processed, a cell is upsized only if it was changed previously during the power recovery process. This is to ensure that hold violations are not introduced. In addition, cells will not be made larger than the original area of the cell.

Returning to the first decisional step 470, if the slack is greater than the slack limit, the process 400 continues to decisional step 480 where a determination is made if there are more paths to process. If so, the process 400 continues to step 485 to process the next path. If there are no other paths to process, the process 400 continues to step 490 and ends. After the failing paths are processed, the scheduled size changes are performed, and a timing update occurs.

Transition and Capacitance Recovery

After the speed recovery portion is completed the speed recovery process identifies any transition and capacitance violations that were introduced by cell downsizing performed during the initial power recovery process. The driver cells on transition violations are replaced with cells that have sharper transition times. Similarly cells with maximum capacitance violations are changed back to cells that can drive a larger load.

Figure 6:
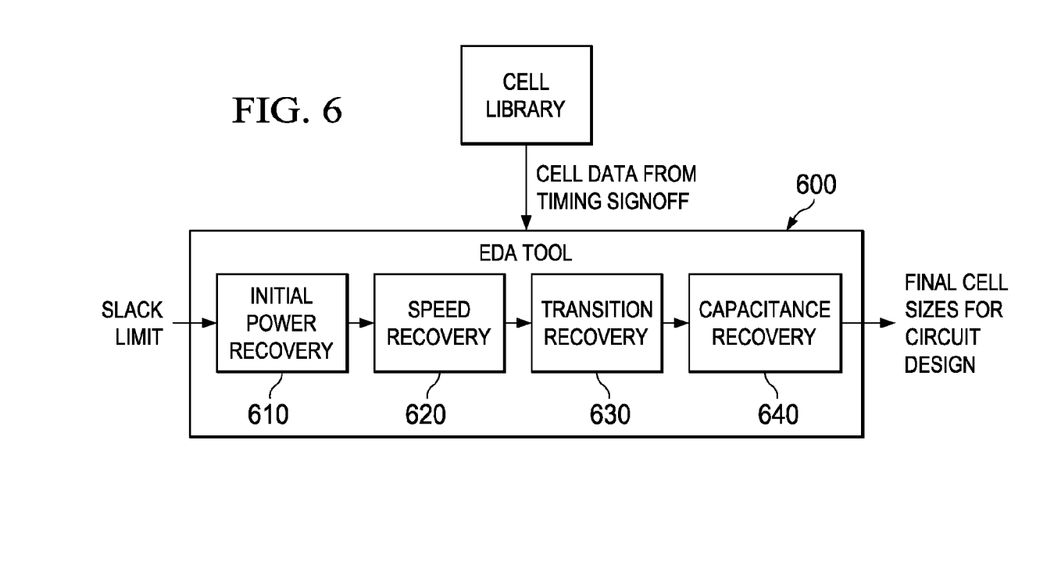
FIG. 6 illustrates a block diagram of an embodiment of an apparatus constructed according to the principles of the present disclosure.

FIG. 6 illustrates a block diagram of an embodiment of an apparatus 600 constructed according to the principles of the present disclosure. The apparatus 600 is configured to perform dynamic power recovery as disclosed herein. To perform the described functions, the apparatus 600 may be embodied as a series of operating instructions stored on a computer-readable medium that directs the operation of a processor when initiated thereby. Accordingly, the apparatus 600 may include a processor and an associated memory. In one embodiment, the apparatus 600 may be a dedicated computing device including the necessary circuitry (including a processor and memory) or software to perform the described functions. The apparatus 600 may be an EDA tool. In some embodiments, the apparatus 600 or parts of the apparatus may be a proprietary EDA tool.

The apparatus 600 includes the necessary hardware, software or combination thereof to perform timing signoff analysis for a circuit design. As such, the apparatus 600 is a signoff analysis tool. For example, the apparatus 600 may be configured to perform timing signoff analysis as performed by the Primetime-SI tool from Synopsys. In addition to performing timing signoff analysis, the apparatus 600 is also configured to analyze the timing of a circuit design and perform cell downsizing to lower dynamic power for cells on paths of the circuit design having a positive timing margin. While performing dynamic power recovery, the apparatus 600 insures that timing performance does not fall below a designated slack limit. The apparatus 600 includes an initial power recovery module 610, a speed recovery module 620, a transition recovery module 630 and a capacitance recovery module 640.

The initial power recovery module 610 receives a slack limit value and cell data for the circuit design. The slack limit value may be input by a user or designer. The apparatus 600 may include an interface, such as a user interface, to receive the slack limit value. In one embodiment, the slack limit value may be provided by another design tool.

The cell data may be provided from a cell library and is based on a design late in the design flow after design timing is closed. As such, the cell data employed meets the performance goals for the circuit design. The cell library may relate corresponding cells that are functionally the same but have different sizes (i.e., different footprints). For example, the cell library may have an index of such corresponding cells.

The initial power recovery module 610 is configured to identify all clock cells and cells that have timing below the slack limit provided and mark these as "dont_swap." All remaining constrained cells are looped on to determine if they should be swapped to achieve better dynamic power. The initial power recovery module 610 may avoid timing updates by estimating delay slowdowns to optimize runtime. After all cells are processed, the cell downsizes are applied and a timing update occurs. After a timing update, timing failures, transition violations, and capacitance violations will be seen.

The speed recovery module 620 is configured to correct the timing failures. The speed recovery module 620 is configured to perform multiple iterations to repair any timing that is below the user specified limit (i.e., the slack limit). Each iteration loops through the failing timing paths of the circuit design and upsizes back the minimum amount of cells to repair the timing while preserving the best dynamic power.

The transition recovery module 630 and the capacitance recovery module 640 are configured to correct the transition and capacitance violations that may have been introduced during the initial power recovery process or the speed recovery process. In one embodiment, the transition recovery module 630 and the capacitance recovery module 640 may be configured to perform conventional transition and capacitance recovery processes carried out in a signoff analysis tool. However, those skilled in the pertinent art will understand that later-developed transition and capacitance recovery processes fall within the broad scope of the disclosure. Cells may again be substituted on the basis of the transition and capacitance recovery processes. After the capacitance recovery module 640 performs capacitance recovery, final cell sizes for the circuit design are generated by the apparatus 600 that, if implemented, is expected to yield a circuit that exhibits at least some degree of dynamic power optimization while meeting the performance target for the circuit design.

The above-described apparatuses and methods may be embodied in or performed by various digital data processors or computers, wherein the computers are programmed or store executable programs of sequences of software instructions to perform one or more of the steps of the methods e.g., steps of the methods or processes of FIGS. 1, 2 and 4. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods. Accordingly, computer storage products with a computer-readable medium that have program code thereon for performing various computer-implemented operations that embody the tools or carry out the steps of the methods set forth herein may be employed. The media and program code may be specially designed and constructed for the purposes of the disclosure, or they may be of the kind well known and available to those having skill in the computer software arts. An apparatus, such as an EDA tool, may be designed to include the necessary circuitry or series of operating instructions to perform each step of the disclosed methods.

Those skilled in the art to which this application relates will appreciate that other and further additions, deletions, substitutions and modifications may be made to the described embodiments.

What is claimed is:

1. A dynamic power recovery system, comprising:
a power recovery module configured to carry out an instance of an initial power recovery process in each of multiple scenarios concurrently, said initial power recovery process including making first conditional downsizing of cells in at least one path in a circuit design with lower dynamic power cells and estimating a delay and a slack of said at least one path based on said first conditional downsizings, wherein said lower dynamic power cells have an internal capacitance that is less than an internal capacitance of said cells first conditionally downsized; and
a speed recovery module associated with said power recovery module and configured to carry out a speed recovery process in each of said multiple scenarios concurrently, said speed recovery process including determining whether said first conditional downsizings cause a timing violation with respect to said at least one path and making second conditional upsizings with higher dynamic power cells until said timing violation is removed.

2. The system as recited in claim 1 wherein said initial power recovery module and said speed recovery module are configured to perform during a timing signoff environment for said circuit design.

3. The system as recited in claim 1 wherein said lower dynamic power cells have a smaller footprint than said cells first conditionally downsized.

4. The system as recited in claim 1 wherein said initial power recovery process further includes exempting clock network cells and cells having transition or capacitance violations from said first conditional upsizing.

5. The system as recited in claim 1 wherein said speed recovery process further includes making said second conditional upsizings with respect to a minimum number of said cells to repair said timing violation.

6. The system as recited in claim 1 wherein said initial power recovery process further includes making said first conditional downsizings on paths of said circuit design having a positive timing margin.

7. The system as recited in claim 1 wherein said speed recovery process further includes employing crosstalk aggression as a cost factor in making said second conditional upsizings.

8. The system as recited in claim 1 wherein said multiple scenarios are multiple PVT corners of said circuit design.

9. The system as recited in claim 1 wherein said circuit design is an integrated circuit design.

10. The system as recited in claim 1 wherein said initial power recovery module and said speed recovery module are embodied in program code stored on a computer-readable medium.

11. A dynamic power recovery method carried out in each of multiple scenarios concurrently, comprising:
making first conditional downsizing of cells in at least one path in a circuit design with lower dynamic power cells, wherein said lower dynamic power cells have an internal capacitance that is less than an internal capacitance of said cells first conditionally downsize;
estimating a delay and a slack of said at least one path based on said first conditional downsizing;
determining whether said first conditional downsizings cause a timing violation with respect to said at least one path;
making second conditional upsizings with higher dynamic power cells until said timing violation is removed; and
merging and applying said downsizings and upsizings and updating timing with respect to said each of said multiple scenarios, wherein said determining is performed by a processor.

12. The method as recited in claim 11 wherein said method is carried out in a timing signoff environment of said circuit design.

13. The method as recited in claim 11 wherein said lower dynamic power cells have a smaller footprint than said cells first conditionally downsized.

14. The method as recited in claim 11 further comprising exempting clock network cells and cells having transition or capacitance violations from said first conditional downsizing.

15. The method as recited in claim 11 wherein said making said second conditional upsizings comprises making said second conditional upsizings with respect to a minimum number of said cells to repair said timing violation.

16. The method as recited in claim 11 wherein said making said first conditional downsizings is performed on paths of said circuit design having a positive timing margin.

17. The method as recited in claim 11 wherein said making said second conditional upsizings comprises employing crosstalk aggression as a cost factor.

18. The method as recited in claim 11 wherein said multiple scenarios are multiple PVT corners of said circuit design.

19. An electronic design automation tool, comprising:
an initial power recovery module configured to identify cells in positive timing margin paths of a circuit design and provide downsized cells for said cells that have a lower dynamic power thereof, wherein said lower dynamic power cells have an internal capacitance that is less than an internal capacitance of said cells first conditionally downsized, said cells complying with a timing signoff of said circuit design; and
a speed recovery module configured to determine timing violations caused by employing said downsized cells for said cells and upsize back a minimum amount of said downsized cells to correct said timing violations.

20. An apparatus, comprising:
circuitry for making first conditional downsizing of cells in at least one path in a circuit design with lower dynamic power cells, wherein said lower dynamic power cells have an internal capacitance that is less than an internal capacitance of said cells first conditionally downsized;

circuitry for estimating a delay and a slack of said at least one path based on said first conditional downsizing;

circuitry for determining whether said first conditional downsizings cause a timing violation with respect to said at least one path;

circuitry for making second conditional upsizings with higher dynamic power cells until said timing violation is removed; and circuitry for merging and applying said downsizings and upsizings and updating timing with respect to said each of said multiple scenarios.

\* \* \* \* \*